F. A. HART.
COMBINED TYPE WRITING AND COMPUTING MACHINE.
APPLICATION FILED DEC. 9, 1914.
1,296,659.
Patented Mar. 11, 1919.
10 SHEETS—SHEET 1.
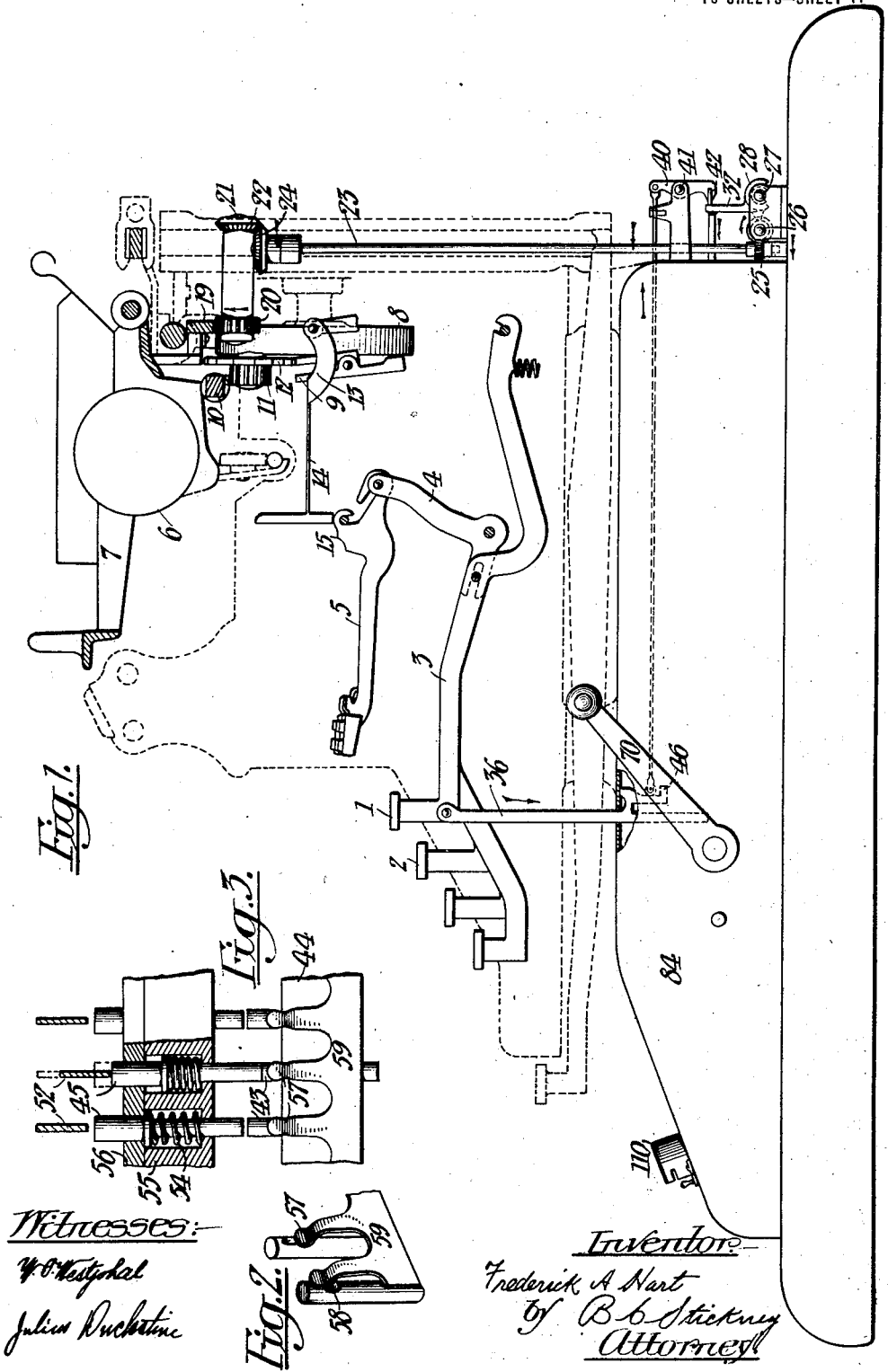

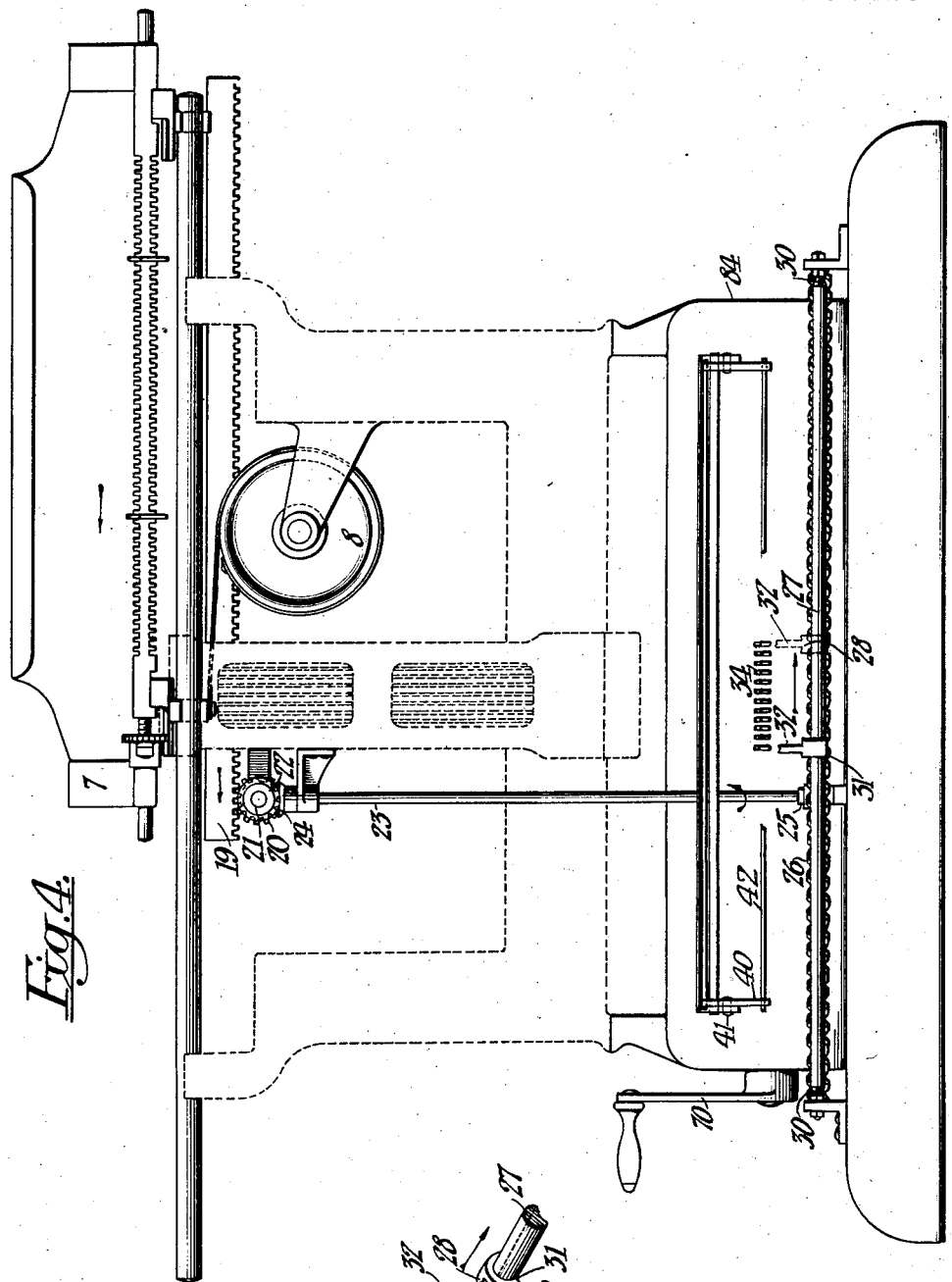
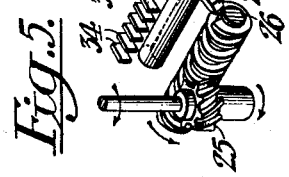

F. A. HART.
COMBINED TYPE WRITING AND COMPUTING MACHINE.
APPLICATION FILED DEC. 9, 1914.
1,296,659. Patented Mar. 11, 1919.
10 SHEETS—SHEET 3.
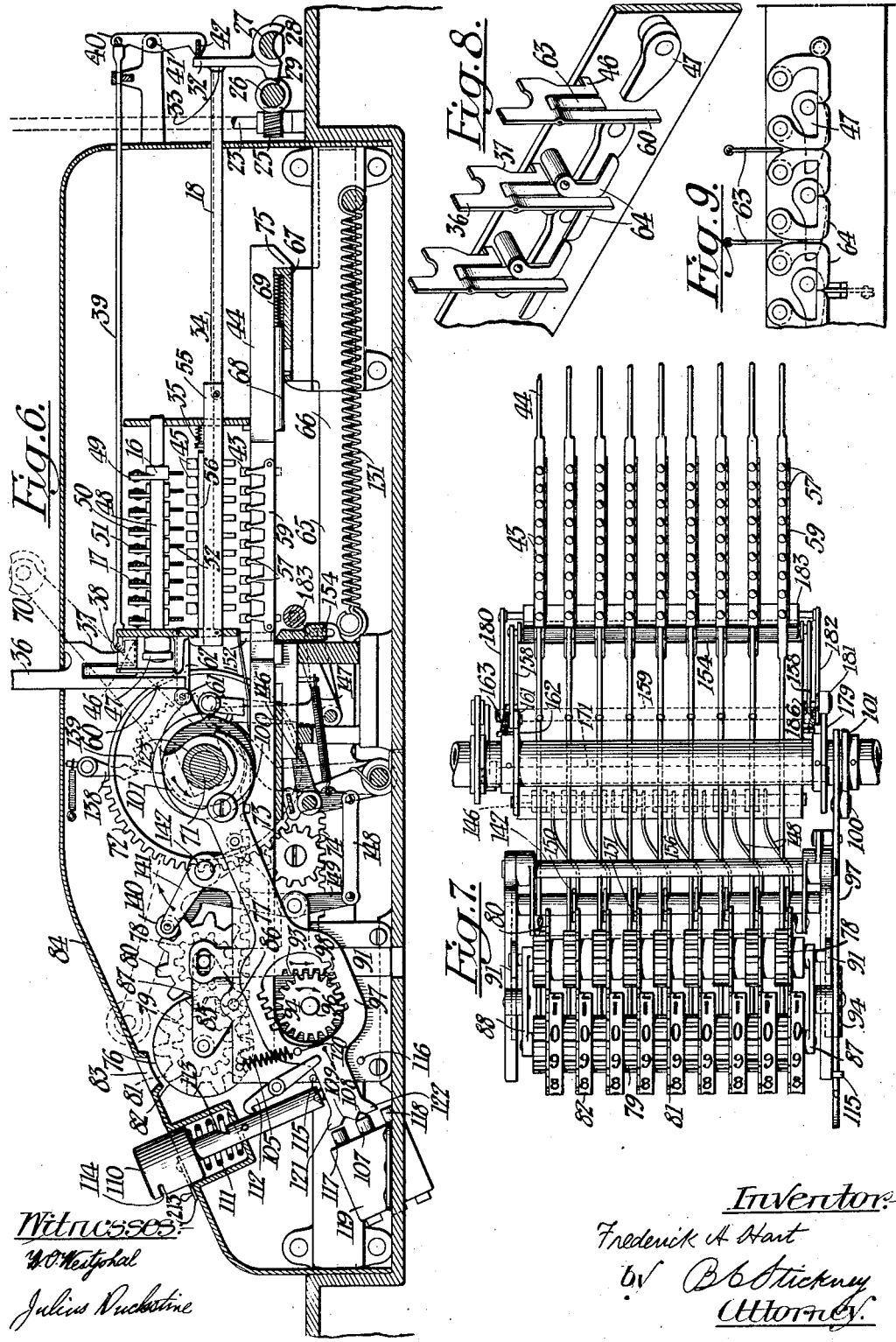

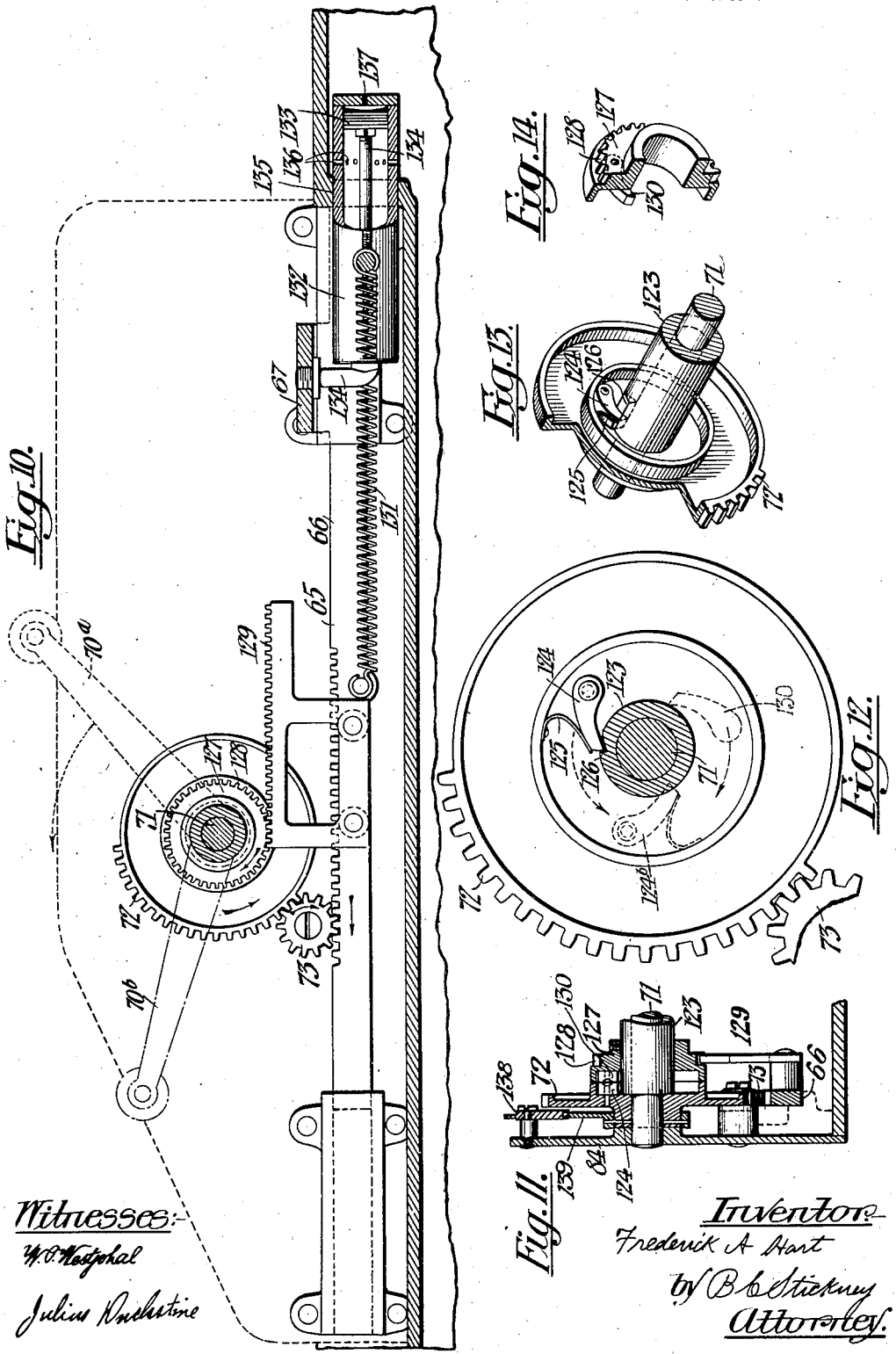

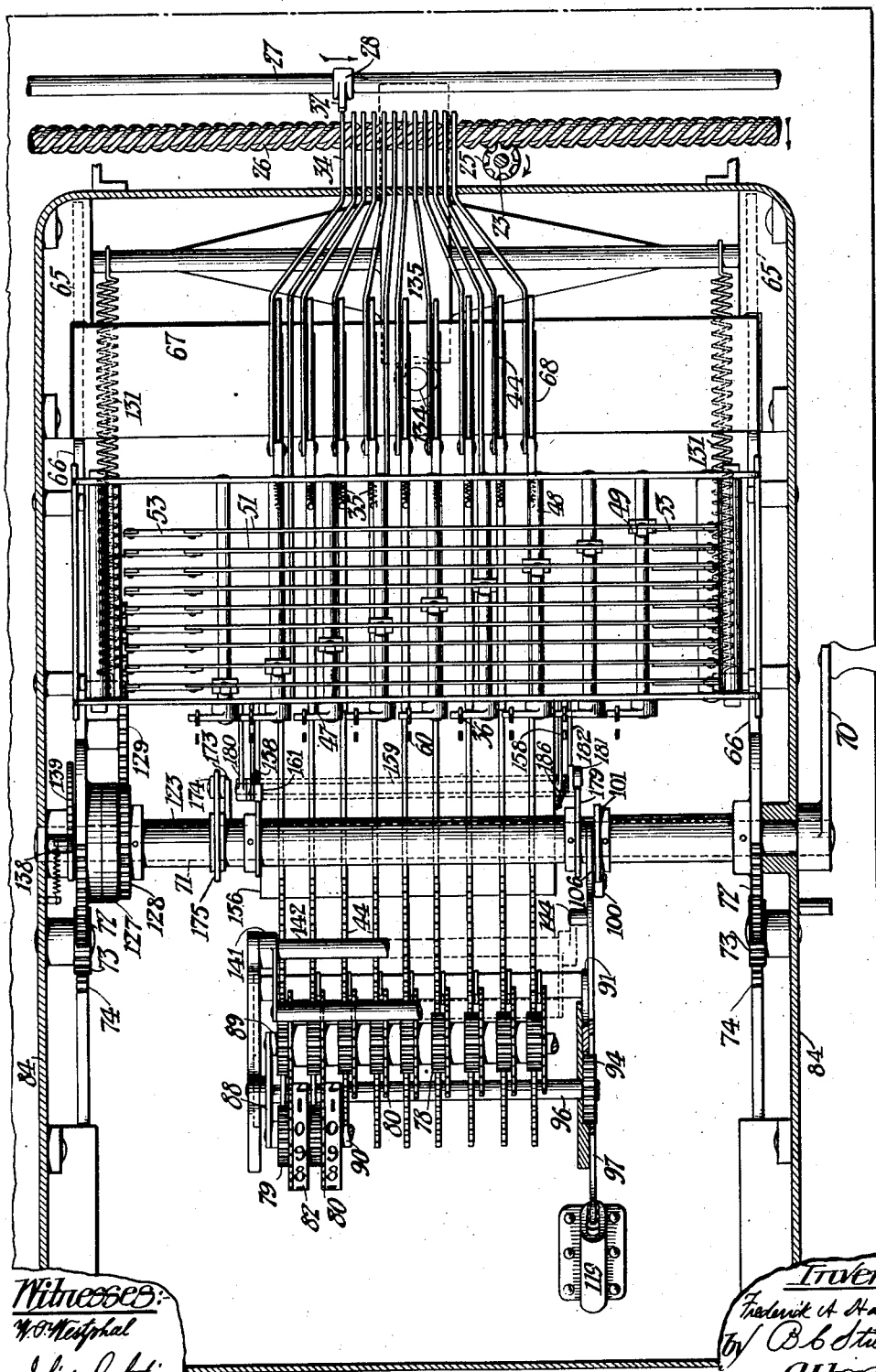

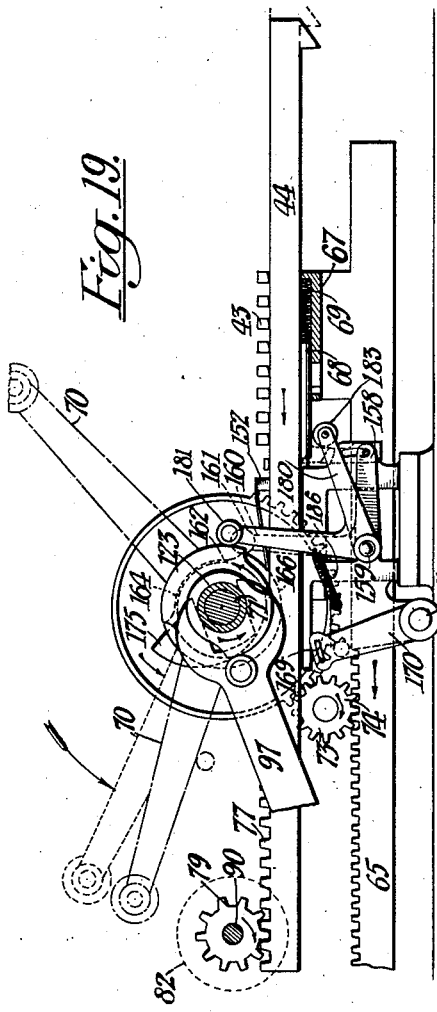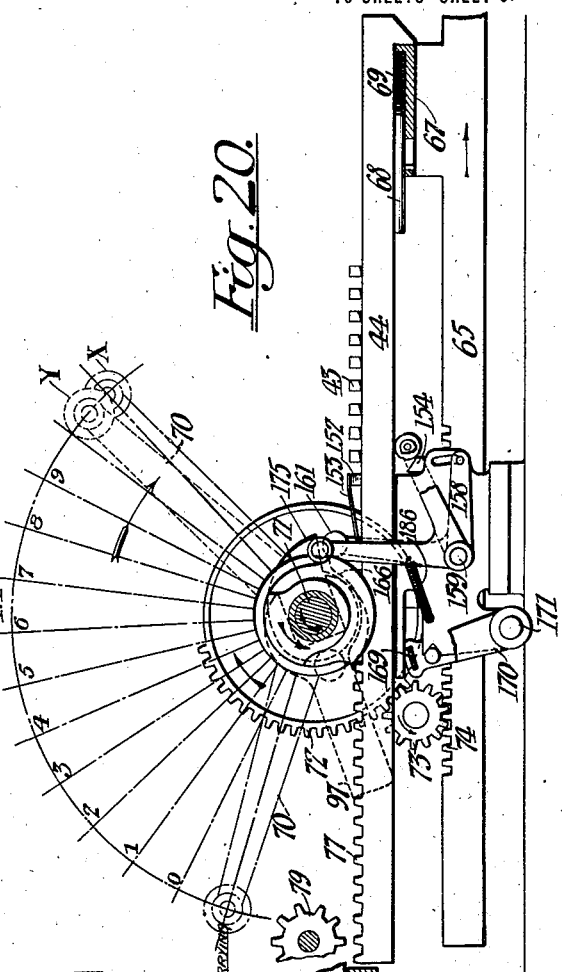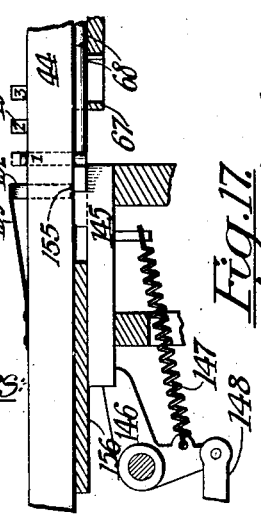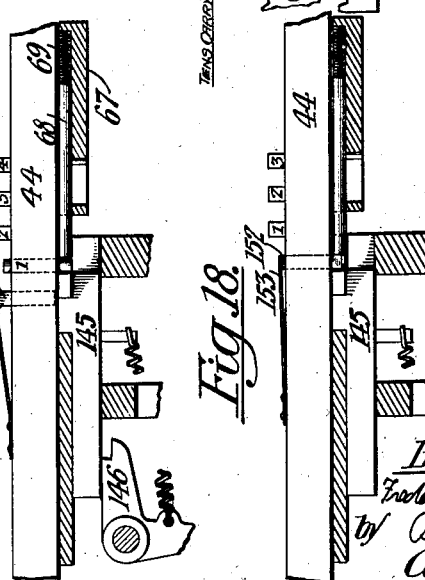

F. A. HART.
COMBINED TYPE WRITING AND COMPUTING MACHINE.
APPLICATION FILED DEC. 9, 1914.
1,296,659.
Patented Mar. 11, 1919.
10 SHEETS—SHEET 7.
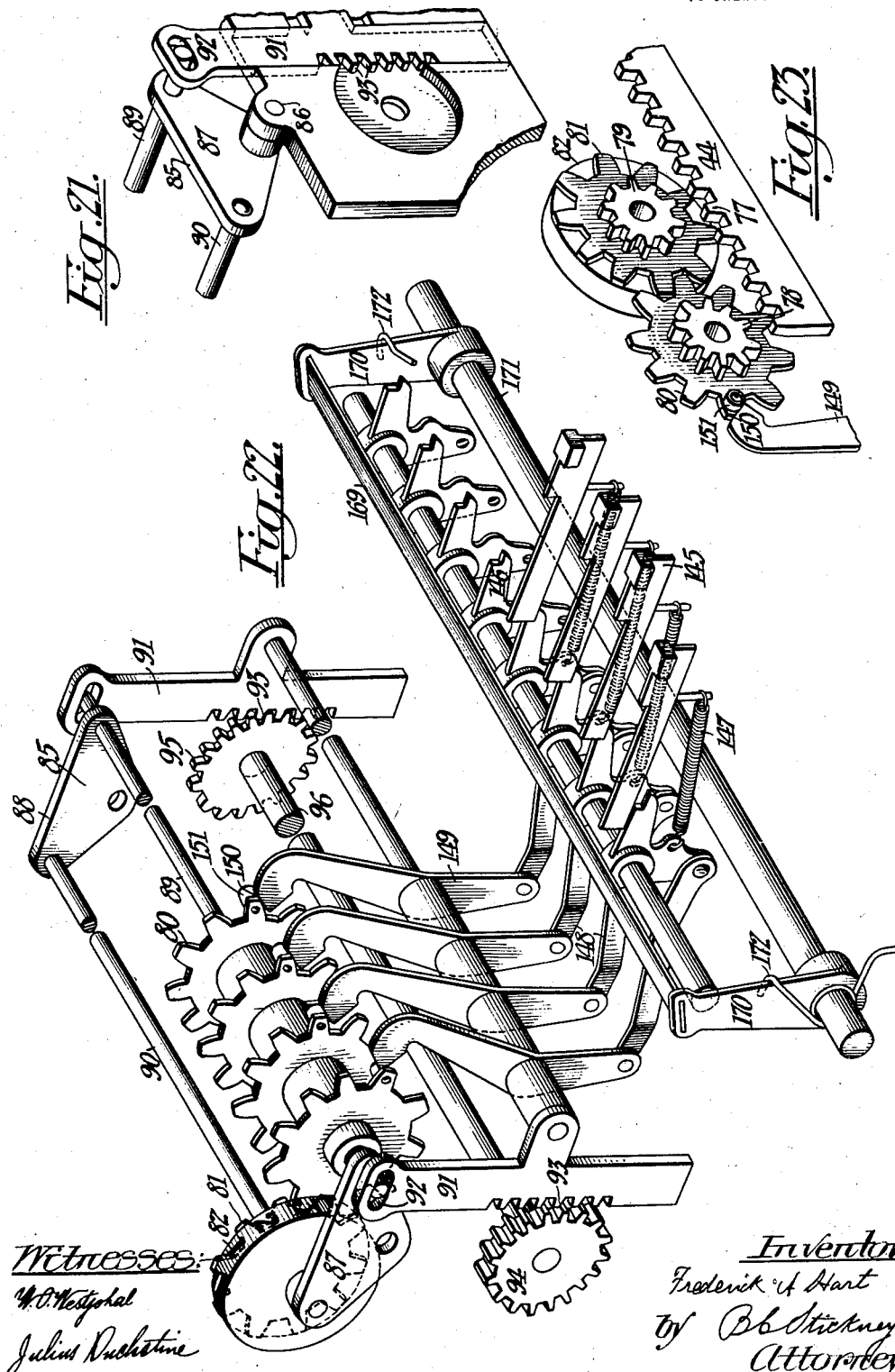

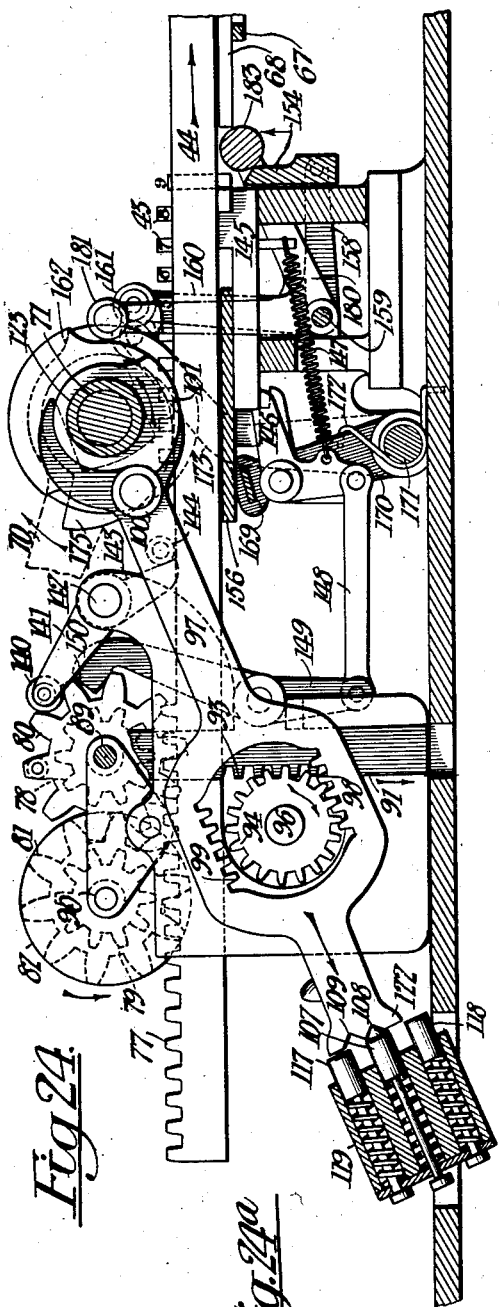
F. A. HART.
COMBINED TYPE WRITING AND COMPUTING MACHINE.
APPLICATION FILED DEC. 9, 1914.
1,296,659.
Patented Mar. 11, 1919.
10 SHEETS—SHEET 8.

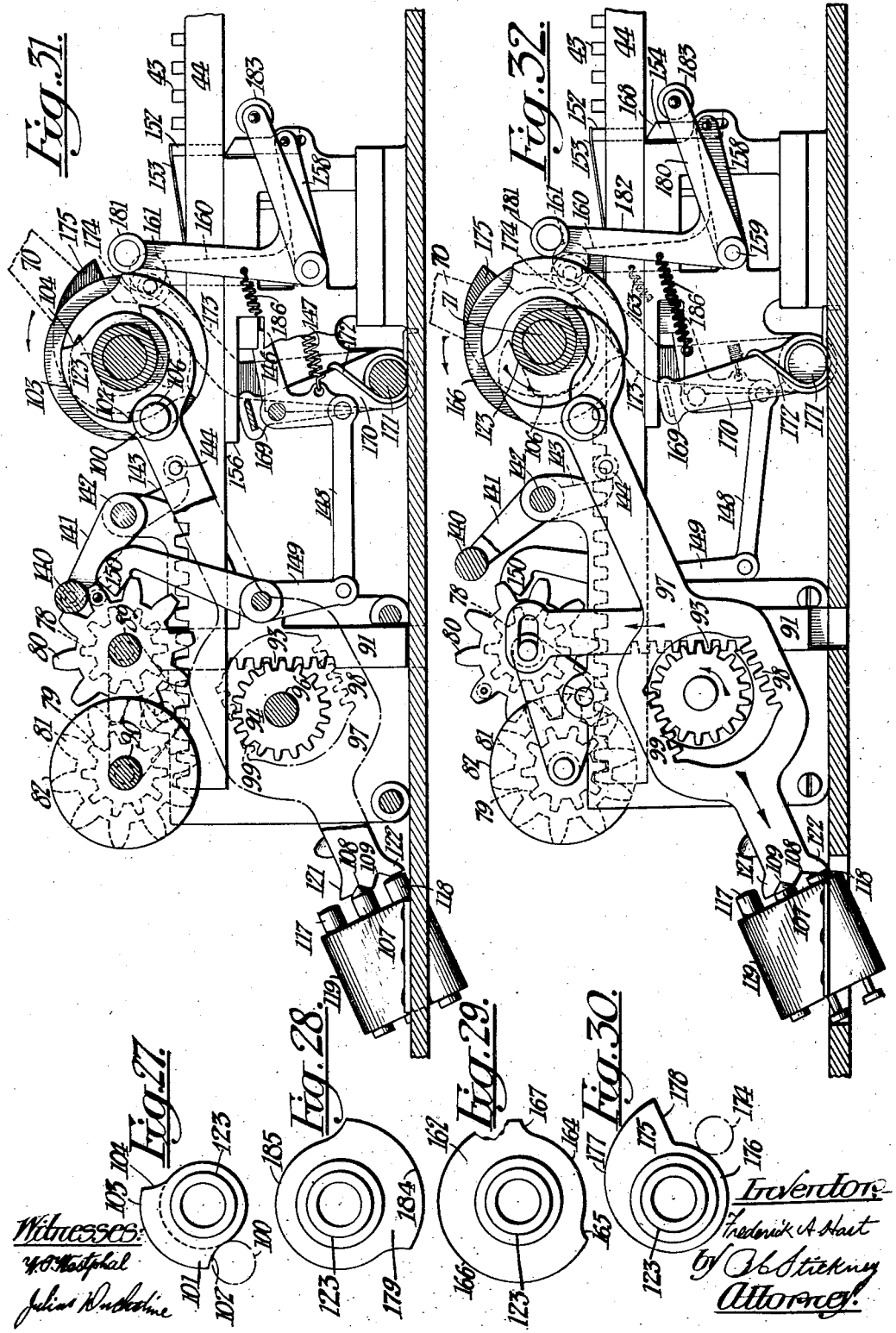

F. A. HART.
COMBINED TYPE WRITING AND COMPUTING MACHINE.
APPLICATION FILED DEC. 9, 1914.

1,296,659.

Patented Mar. 11, 1919.
10 SHEETS—SHEET 10.

WITNESSES:
W. P. Westphal
Julius Duchstein

INVENTOR:
Frederick A. Hart
BY D. C. Stickney
ATTORNEY.

UNITED STATES PATENT OFFICE.

FREDERICK A. HART, OF NEWARK, NEW JERSEY, ASSIGNOR, BY MESNE ASSIGNMENTS, TO UNDERWOOD COMPUTING MACHINE COMPANY, OF NEW YORK, N. Y., A CORPORATION OF NEW YORK.

COMBINED TYPE-WRITING AND COMPUTING MACHINE.

1,296,659.

Specification of Letters Patent. Patented Mar. 11, 1919.

Application filed December 9, 1914. Serial No. 876,189.

*To all whom it may concern:*

Be it known that I, FREDERICK A. HART, a citizen of the United States, residing in Newark, in the county of Essex and State of New Jersey, have invented certain new and useful Improvements in Combined Type-Writing and Computing Machines, of which the following is a specification.

This invention relates to a combined type-writing and computing machine, and more particularly to the type of machine in which the numbers to be computed are first registered or set up digit by digit so as to afford a preliminary representation of a number, and then all of the digits of the number run up together in the computing wheels of one or more registers.

In the present improvement the computing wheels are provided with what may be termed a phalanx drive, including denominational members, one for each computing wheel. These denominational members are provided with indexing mechanisms in the form of settable index pins to determine the extent of movement thereof. In the present disclosure the numeral keys perform the work of not only setting the pins, but also of shifting to select the particular row or denomination of pins in which a setting is to be effected. For this purpose an interponent, advantageously in the form of a set of selecting pins for each denominational member, is provided, which are normally out of register with the index pins, but shiftable at the operation of a numeral key into register therewith. The shifting may be effected from the numeral key, but through the aid of a traveling selector which is controlled in its position from the typewriter carriage. This, then, relieves the typewriter carriage of the actual burden of moving the selecting members, which, however, in itself is much smaller than heretofore, as the denominational members themselves which carry the index pins are now shifted in the act of setting the pins.

The denominational members, which also form driving or actuating members for the computing wheels, may act on their forward stroke both for addition and for subtraction, the change being made for one or the other type of computation by alternatively shifting one of two sets of gears into mesh with the rack bars so as to determine the direction of rotation of the number-bearing computing wheels. The shift is advantageously made at the instant of starting into motion of a general operator, which so drives the rack bars that by the time the rack bars themselves have started into motion, they will be in mesh to drive the computing wheels either forwardly or backwardly according to the type of computation.

In the present disclosure the tens carrying is effected by the driving rack bars or denominational members themselves at the finish of transferring the actual digits of the number computed to the computing wheels. Means is therefore provided for giving the denominational rack bars an added step of movement in case a carry over is to be effected to a computing wheel associated with any particular denominational member. This is accomplished by the next lower computing wheel tripping a locking slide which ordinarily prevents this excessive or added movement of a denominational rack bar.

Improved means may be provided for restoring the set index pins to a normal position, this being done on the return stroke of the general operator, and by means of a roller which is normally in an ineffective position. The roller is brought to the restoring position, however, at the proper instant in the movement of the general operator, by camming means.

Various other parts of the mechanism may be operated by cams, which in turn are in action at particular points in the movement of the general operator. In the present disclosure the machine is shown to be operated by a crank, which is given about a third of a revolution, and this amount of movement is magnified to a complete revolution with the parts which carry the cams, so that a complete cycle of operations can be effected during a back-and-forth movement of the crank, through a third of a revolution.

Other features and advantages will hereinafter appear.

In the accompanying drawings

Figure 1 is a skeleton view in elevation taken partly in section from front to rear, and showing the general relation of the typewriting mechanism to the computing mechanism.

Fig. 2 is a detail perspective view of a couple of the index pins on one of the denominational rack bars, showing one of the pins as set, and bringing out the means for locking the pins in their unset position.

Fig. 3 is a fragmentary view in side elevation partly in section, showing the relation of the interponent pins to the index pins on the denominational bars, and showing one of the interponent pins in its depressed position in the act of setting an index pin.

Fig. 4 is a skeleton view in rear elevation, showing the means whereby the denominational selection is controlled indirectly from the carriage, and showing the carriage on its return movement.

Fig. 5 is a skeleton perspective view of the denominational selecting mechanism, and particularly that part which directly manipulates the denominational bars.

Fig. 6 is a vertical section from front to rear through the computing casing, showing the general operator as started in its movement with the mechanism about to be shifted for an adding operation.

Fig. 7 is a reduced plan view showing the relation of the denominational rack bars or actuators to the computing wheels.

Fig. 8 is a detail perspective view showing the thrust links operated by the numeral keys, which in turn operate the setting and denominational selecting mechanism, and their relation to the latter as well as to the key lock.

Fig. 9 is a face view of some of the parts shown in Fig. 8.

Fig. 10 is a fragmentary view showing in dotted lines the starting position of the general operator handle, and in dot-and-dash lines the forward position, and the mechanism actuated thereby, whereby this oscillation of approximately one-third of a revolution, or 120 degrees, will effect a complete rotation of 360 degrees of some of the parts of the computing mechanism.

Fig. 11 is a sectional view through the driving pawl mechanism whereby the vibratory movement of the general operator handle gives a complete rotation to the general operator shaft.

Fig. 12 is a face view showing the several positions of the pick-up pawls illustrated in Fig. 11.

Fig. 13 is a detail view of one of the pick-up pawls.

Fig. 14 is a detail sectional view of the mechanism connected with the other of the pick-up pawls from that shown in Fig. 13.

Fig. 15 is a horizontal section showing the relation of the setting linkages to the denominational bars, and also of the denominational selecting mechanism to the denominational bars.

Fig. 16 is a detail vertical section showing one of the actuating denominational rack bars as having been moved forward with the "1" pin set, and without effecting a tens-carrying operation.

Fig. 17 is a view similar to Fig. 16, the mechanism, however, effecting a tens-carrying to a computing wheel in register with the rack.

Fig. 18 is a view similar to Figs. 16 and 17, with the exception that no pin is set corresponding to the striking of the "0" key in the denominational column according to its denominational member, but in which a carry over is being effected as having been initiated from the next lower in denomination computing wheel.

Fig. 19 is a vertical section showing the "1" pin as set on one of the denominational rack bars, and the various positions of the general operator handle at the start, at the end of the running in of the number, which in this case is "1", and at the finish of the stroke after the tens-carrying springs have been compressed if a tens-carrying operation has not been effected.

Fig. 20 is a view similar to Fig. 19, showing the parts in a position corresponding to the start in movement of the general operator, the various angular positions of the general operator handle corresponding to a return movement of the latter, showing the opposite rotations of different parts on the same axial center.

Fig. 21 is a skeleton perspective view of the shifting mechanism for bringing one or the other of the sets of the computing wheels into action for addition or subtraction.

Fig. 22 is a skeleton perspective view of the tens-carrying mechanism, showing the trip for the units computing wheel as being started into action.

Fig. 23 is a detail perspective view, showing the tens-carrying mechanism in the act of being tripped by the computing wheel, and showing the computing wheels as disconnected from their actuating rack bar or denominational members.

Fig. 24 is a sectional view taken from front to rear, showing the general operator and the rack bars on their return movement and as disconnected from the computing wheels; also illustrating how the pins are restored to their normal positions.

Figure 33:
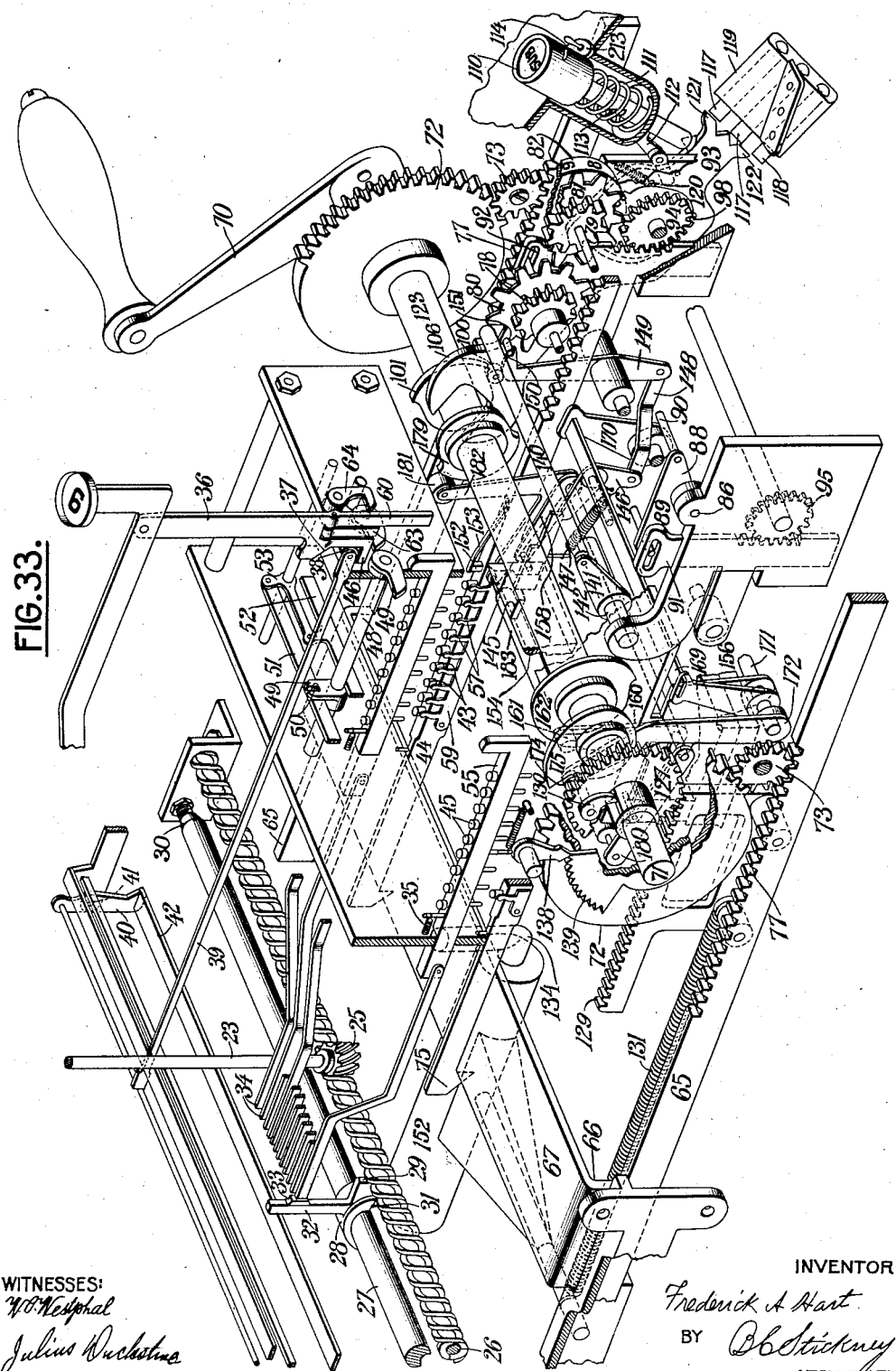

Fig. 24ª is a perspective view of one of the special pins on one of the denominational rack bars, which enables a carry-over operation when no digit has been run into the computing wheel corresponding thereto.

Fig. 25 is a perspective view, showing the tens-carrying locks or obstructors, with one of the same (the fourth from the highest in denomination) in a position to permit a tens-carrying operation.

Fig. 26 is a fragmentary top plan view of the tens-carrying trips, showing how they are offset so that the lower computing wheels bring into play the tens-carrying mechanism for the next higher computing wheels.

Fig. 27 is a detail view of the cam which controls the shifting of the computing wheels for both addition and subtraction.

Fig. 28 is a detail view of the cam which controls the restoring of any of the index pins which may happen to be set.

Fig. 29 is a detail view of the cam which determines whether the special carry-over pins shall be effective for a carry-over operation or not.

Fig. 30 is a detail view of the cam which controls the restoring of the carry-over slides to their normal positions.

Fig. 31 is a detail view showing the mechanism set for subtraction and the general operator at the start of its forward stroke.

Fig. 32 is a view similar to Fig. 31, except that the general operator and its handle has advanced farther in its movement, and the computing wheels have been thrown into mesh with the rack bars for subtraction.

Fig. 33 is a skeleton perspective view showing the general relation of the more important parts of the computing mechanism.

Referring briefly to the parts of the typewriting mechanism, which in the present instance is shown to be of the well-known Underwood type, numeral keys 1 (Fig. 1) and alphabet keys 2, depress key levers 3, to rock bell cranks 4, so as to swing type bars 5 up rearwardly against the front side of a platen 6, mounted to rotate on a traveling carriage 7. The carriage 7 is given a step-by-step movement at the striking of any of the keys 1 and 2, by the traction of a spring barrel 8, under the control of an escapement mechanism indicated in general at 9. This escapement mechanism includes a rack 10, pivotally mounted on the carriage 7, and engaging a pinion 11, to which is connected an escapement wheel 12. The escapement wheel 12 is controlled in its rotation by pawls or dogs 13, mounted to be oscillated by a universal frame 14, which lies in the path of heels 15, one of which is provided on each of the type bars 5.

The numeral keys 1 in addition to performing typewriting actions, also operate computing mechanism indicated in general at 16 (Fig. 6). To do this, the computing mechanism brings into play a pin-setting mechanism, indicated in general at 17, and a denominational selecting mechanism, indicated in general at 18. The denominational selecting mechanism, which will be considered first, is for the purpose of according the denominations of the digits as printed by the typewriting mechanism, with the digits as set up for computation by the computing mechanism.

On the typewriter carriage 7 there is provided a rack 19 (Figs. 1 and 4), which meshes with a pinion 20 provided on a shaft 21, so as to rotate this shaft step by step with the step-by-step advancing movements of the carriage 7. The shaft 21 is provided with a bevel gear 22, so as to transmit the rotation of the shaft to a second shaft 23, through the intermediary of a second bevel gear 24. The shaft 23 is provided, at its lower end, with a 45-degree worm gear 25 (Figs. 5 and 6), which meshes to drive a worm wheel 26.

Slidingly mounted on a shaft 27, parallel with the worm 26, there is provided a traveling selector 28, which has a tooth 29 engaging between the spirals of the worm 26, so that as the latter rotates, the selector 28 will be advanced step by step to correspond with the advancing movement of the carriage 7. The shaft 27 is reduced at one or both ends as at 30, and the selector 28 has an open side 31, so that it can be slipped from the shaft if desired. The selector 28 is provided with an upstanding finger 32, having a tooth 33 arranged to engage individually the back ends of a series of interponent selector bars 34. The selector bars 34 are normally held by springs 35 in their inactive rearmost positions until a numeral key is depressed, when the selector 28 will advance whichever selector bar 34 it happens to be in register with, against the tension of its spring 35. The selector bars 34 are formed of two parts pivotally connected and converge at their rear to correspond with letter-space movements of the selector 28, while being wide-spread at their front to correspond with the wide-spread relation of the computing wheels.

The selector 28, however, does not of its own initiative, perform the actual work of shifting the selector bars 34, but is actuated when a numeral key 1 is actuated. That is to say, the carriage 7 while it does the light work of shifting the selector 28 step by step, does not swing the selector 28 against the tension of the springs 35. The actual work of this movement is performed by the numeral keys 1 themselves.

Considering this phase of the question, each of the numeral keys 1 from "1" to "9" is provided with a downwardly-extending thrust link 36, which is provided with a cam shoulder 37 arranged to engage a follower roller 38 on a rearwardly extending horizontal thrust link 39 (Fig. 6). The thrust link 39 is connected to rock a frame 40, pivoted at 41. This frame 40 may be termed a universal frame, in that it is universal to all positions of the selector 28 when in register with one of the selector bars 34. The universal frame 40 is provided with a universal bar 42, which when the frame is rocked will engage and rock the selector 28, to thrust before it the particular selector bar 34 which happens to be in register with the selector 28.

The purpose of this selecting action is to enable the pin-setting mechanism 17 to set any particular pin of a nest of pins 43, according to the numeral key actuated, and according to the denomination in which it is actuated. The pins 43 are arranged in rows on denominational members 44, which, as will be seen later, are also driving or actuating members, and are also arranged in transverse rows of pins of the same value corresponding to the values of "1" to "9". The selector bars 34 carry corresponding series of setting or interponent pins 45, which, however, are normally out of register with the pins 43. The movement of any of the selector bars 34 against the tension of its spring 35 at the striking of a numeral key, will bring the pins 45 in superposed alinement with or relation to the pins 43, enabling the pin-setting mechanism 17, when operated, to set, through one of the pins 45, one of the pins 43.

To do this, each of the thrust links 36 has a foot or stem 46, arranged to engage an arm 47 on a rock shaft 48. There is one of these arms and rock shafts for each one of the numeral keys from "1" to "9". The rock shafts 48 are also provided with arms 49, arranged in order, which engage and actuate linkages 50, which linkages comprise the usual upper and lower reaches 51 and 52 connected by arms 53, so as to move in parallel relation. Normally the pins 45 are out of alinement and therefore out of reach of the linkages 50, but when any one of the selector bars 34 is advanced in a denominational selection action, it brings the pins 45 within reach of the pin-setting linkages 50, and within striking distance of the index or valuating pins 43.

It will thus be seen that as a numeral key 1 is struck, it will first rock the universal frame 40 to bring the particular selector bar 34 corresponding to the denomination at the printing point of the typewriting mechanism into play, so that the pins 45 thereon will lie between the pin-setting linkages 50 and the index or valuating pins 43. Then further downward movement of the numeral key will rock the associated shaft 48 to spread the pin-setting linkage 50, depressing the lower reach 52 thereof, so as to depress the particular pin 45 within range, which in turn will depress the particular pin 43 beneath it, as seen at Fig. 3. The particular pin 43 set will correspond in its distance from the front of the series of pins on the denominational member 44, with the value of the numeral key actuated.

The interponent setting pins 45 are normally held in a raised position by means of individual springs 54 (Fig. 3), which are inclosed in a guiding casing 55 for the pins 45, and engage a collar 56 provided on each pin. The downward position of the interponent or setting pins 45 therefore is but temporary, as they will return as soon as the pressure on the numeral key is relieved. The indexing pins 43, however, are held in their depressed position by spring-detent fingers 57, which also normally hold them in their raised position by engaging depressions 58 in the pins. For the purpose of simplifying the manufacture and reducing the cost, a series of the detents 57 are stamped and swaged from a single strip of metal 59, so that one detent member with its fingers serves a whole row of the index pins 43, and is secured in position on the associated denominational bar 44.

In order to prevent the stems or thrust links 36 from backing away due to the camming action of the shoulder 37 on the follower 38, each link 36 is provided with an extension 60 which engages a bearing roller 61 (Fig. 6), which coöperates with arms 62 to guide the thrust link for vertical movement.

To prevent more than one numeral key from being operated at a time, each of the thrust links 36 is provided with an intruder 63 (Figs. 8 and 9), mounted for pivotal movement on the associated stems 36, and arranged to force itself between one pair of a series of pivotal locks 64. These locks 64 are so crowded together that they permit the insertion of but a single intruder 63, when all of the space through which they are permitted to swing will be taken up, whereby no further intruder connected to any other numeral key can be inserted between the members of the series of locks. Hence no other numeral key can be depressed. The pivotal connection of each intruder 63 to its stem 36 permits the stems to move vertically without squirming, and yet allows for any canting due to eccentric swinging of the locking member 64.

It has thus far been shown how the index or valuating pins 43 are set up one by one and individually on the denominational members, so as to determine the extent of movement of these denominational members, which are also driving members. The index pins 43 thus set up represent the digits of the number to be computed, and project below the denominational members 44, so as to lie in the path of a general operator 65, which is actuated to advance the denominational members 44 amounts corresponding to the particular pins 43 set.

The general operator 65 includes side plates 66, connected by a cross bar 67, which is provided with a series of plungers 68 in line with the denominational bars 44, and so positioned as to engage any set pins 43 on the bars. The plungers 68 are normally held in a projected position as in Fig. 6, by springs 69, which springs are utilized to effect carry-over operations, as will be explained hereafter. The springs 69, however, are strong enough to permit the general operator 65 to force the bars 44 before it without collapsing until the final movement of the general operator.

The general operator 65 may be given its movement in any suitable manner, and in the present instance is shown to be driven from a hand crank 70, which moves through approximately one-third of a revolution, or 120 degrees, between the two dotted-line positions shown in Figs. 6 and 10, or, in other words, from the full-line position shown in Fig. 1 to the foremost position shown in dotted lines in Figs. 6 and 10, and back again to the rearmost position. The crank 70 is secured to an inner shaft 71, on which is also secured a large mutilated gear 72, meshing to drive a gear 73 which meshes with a rack 74 provided on one of the side plates 66 of the general operator. The general operator 65, then, on the forward stroke of the crank 70, is advanced carrying with it the denominational bars 44, which have pins 43 set thereon, and on the return stroke the rear end of the cross bar 67 engages overhangs 75 provided on the denominational bars 44, and returns them with it. The forward motion of the denominational bars 44 is used to drive the computing wheels of a computing register or totalizer 76, so that they will be rotated amounts corresponding to the pins 43 set up, and thus according with the numeral keys which have been previously struck. The arrangement is such, however, that the computing wheels may be rotated in one direction for adding, and in the opposite direction for subtracting. To effect such a selective drive, the denominational bars 44 are provided at their front ends with racks 77, which may be made to drive directly either a series of gears 78 or a series of gears 79. When driving the former, the computing operation will be an adding one, and when driving the latter, the computing operation will be a subtracting one.

The gears 78 are each secured to a computing wheel 80, while the gears 79 are each secured to a computing wheel 81. The computing wheels 81 carry dial or number-bearing wheels 82, which are arranged to exhibit their numbers through a sight opening 83 in a computing casing 84 (Fig. 6). The computing wheels 80 mesh with the computing wheels 81, so that if the gears 78 are in mesh with the racks 77, the forward computing wheels and their dial wheels 82 will also be rotated, the direction of rotation, however, being opposite from that when the gears 79 are in direct mesh with the racks 77.

To enable this alternative drive for addition or subtraction, the gears 78 and 79 and the computing wheels 80 and 81, are mounted on a swinging floating frame 85 (Figs. 6, 21, 22, 24, 31 and 32), which rocks about an axial pivot 86, so as to alternatively shift from a neutral position shown in Fig. 6, either the gears 78 into mesh with the racks 77 for an adding operation, or the gears 79 into direct mesh with the racks 77 for a subtracting operation as shown in Fig. 32.

The floating frame 85 (Fig. 22) may comprise side plates 87 and 88, supported by the pivotal axis 86, and connected by shafts 89 and 90, the former of which forms a pivot for the units comprising the gears 78 and the computing wheels 80, while the latter forms a pivot for the units comprising the gears 79 and the computing wheels 81. The shaft 89 may project beyond the side plates 87 and 88, so as to be engaged by the shifting mechanism, which brings about a meshing of either the gears 78 or the gears 79 with the racks 77.

This shifting mechanism may include a pair of rack bars 91, which have a slotted engagement 92 with the extensions of the shaft 89, and move in parallel relation so as to move the shift frame 85 evenly. The rack bars 91 are provided with racks 93, which are driven by gears 94 and 95 secured on a shaft 96. The gear 94 is of greater width than the rack bar 91 with which it meshes, so that it presents a sufficiently broad toothed surface to be engaged by a double rack bar 97 (Figs. 6, 24, 31 and 32), which is used to drive it alternatively in one direction or the other according as to whether an adding or a subtracting operation is desired. The double rack bar 97 encompasses the gear 94, and is provided with oppositely-facing racks 98 for addition, and 99 for subtraction, which may be alternatively meshed with the gear 94.

The double rack bar 97 is, in effect, then, a driver for the gear 94, and must be actuated before there is actually any driving movement of the denominational rack bars 44, so that the computing wheels will be in position to be driven at the time they are likely to be driven. For this purpose, the distance between the plungers 68 and the highest pins 43 is sufficient to permit an idle movement of the general operator relative to the driving rack bars 44, which will be taken up in shifting the floating frame 85 to bring about a driving relation of either set of computing wheels with the racks 77.

The double rack bar or driver 97, which effects the shifting, is operated at the beginning of the forward stroke of the general operator 65. For this purpose, it is provided with a follower 100, which is engaged and driven by a cam 101 (Figs. 27 and 31). The cam 101 has a steep rise 102, which comes into engagement with the follower 100 at the very first portion of the stroke of the crank 70 corresponding to the first part of the movement of the general operator 65, and will instantly force the follower 100 out on to a dwell portion 103 of the cam 101, which is concentric with the axis of rotation of the cam 100. This movement is sufficient to shift the frame 85 in one direction or the other for a complete meshing of the gears 78 or 79 with the racks 77.

The dwell portion 103 is just a little less than one-third of a circumference, so that the driver 97 will be advanced to actuate the gears 94, 95, and shift the rack bars 91 to bring about a driving relation between the computing wheels and the racks 77 at the first part of the forward movement of the hand crank 70 and the general operator 65, and will maintain the driving relation until just after the termination of the forward stroke of the general operator 65 and the hand crank 70, when the follower 100 will move back at a dip 104 provided beyond the dwell portion 103 of the cam 101.

Before considering the further movement of the cam 101, it will be shown how the driver 97 is made to mesh either its rack 98 or its rack 99 with the gear 94, so as to effect either an adding shifting, as in Fig. 6, or a subtracting shifting as in Figs. 31 and 32. Normally the driver 97 is held by a spring 105 in the position shown in Fig. 6, with the adding rack 98 in mesh with the gear 94, the driver 97 having a sliding fulcrum by being forked at 106 to encompass the shaft 71. The other end of the driver 97 is yieldingly held in one position or the other by a cushion detent 107, whose apex engages alternatively in one or the other of a pair of notches 108 and 109 in the driver 97. When in an adding position the notch 108 of the driver is engaged by the cushion detent 107, and when in a subtracting position, the notch 109 is engaged by this detent.

To shift from the adding position shown in Fig. 6 to the subtracting position shown in Fig. 32, there is provided a subtraction key 110, which may be depressed against the tension of a spring 111 to depress the lower end of the driver 97 against the tension of its spring 105. The subtraction key 110 will be caught in its depressed position for one computing operation, by a latch 112, which engages a notch 113 provided in the stem of the subtraction key 110. If the subtraction key 110 should be held depressed for a number of subtracting operations, a special lock 213 (Fig. 6) may be swung into position to engage a slot 114 provided in the subtraction key 110. When the subtraction key 110 is depressed, it lowers the driver 97 from a position in engagement with a stop 115, to a position in engagement with another stop 116, when the rack 99 will be brought into mesh with the gear 94.

As the cam 101 rotates to slide the driver 97 downwardly, not only the cushion detent 107 yields to permit this movement, but also one of two other cushioning members 117 and 118 (Fig. 24) comes into play to enable a subsequent return movement of the driver 97, when the follower 100 slips off the dwell portion 103 of the cam 101. It will be seen by reference to Fig. 24, that the cushioning members 107, 117 and 118 are in the form of spring-pressed plungers which recede into a casing 119 before the oncoming driver 97, and serve to return the same when the follower 100 has escaped the cam 101. The plungers 117 and 118 are alternative in their action according to the position of the driver 97 for an adding or a subtracting operation.

At almost the very end of the forward movement of the driver 97, the latch 112 is tripped by a pin 120 on the driver 97 engaging the same. The driver 97, however, is not permitted to unmesh with respect to the gear 94, as a lug or extension 121 will engage under the cushion 117 (Fig. 32), which forms in this way a guide lock. In other words, the driver 97 cannot escape from the gear 94 until it has returned it, the shifting frame, and the computing wheels manipulated thereby, to a normal neutral position.

In a similar manner in an adding shifting, the other cushion 118 is engaged by a foot 122 on the driver 97, which prevents the unmeshing of the rack 98 with the gear 94, in case of an erroneous operation of the subtraction key 110 while the general operator is in motion.

While the hand crank 70 vibrates back and forth for one complete reciprocation of the general operator 65, it is not desirable to have the cam 101 vibrate in this manner, it being preferable to have the same operate the driver 97, then escape therefrom, and finally complete a revolution to its normal position ready for a subsequent operation, that is to say, it is desired to have the cam 101, and, as will be seen hereafter, certain other parts, effect a complete revolution of 360 degrees while the hand crank 70 is moving forwardly and backwardly through an arc of about 120 degrees. To effect this motion, the cam 101 is not secured directly to the shaft 71, to which the hand crank 70 is secured, but is mounted on a sleeve 123 which is coaxial with the shaft 71.

To effect the drive of the sleeve 123 for a complete rotation during a back-and-forth vibration of the hand crank 70, the gear 72, which, it will be remembered, is secured to the shaft 71, is provided with a driving pawl 124 (Figs. 11, 12 and 13), which is normally held by a spring 125 in engagement with the shoulder of a notch 126 provided in the sleeve 123. The pawl 124 and the notch 126 are normally in register with each other when the hand crank 70 is at its normal starting position. As the hand crank 70 moves from the 70ª position (Fig. 10) to the 70ᵇ position, the pawl 124 advances from the full-line position (Fig. 12) to the dotted-line position indicated specifically at 124ᵇ (Fig. 12). That is to say, during the third of a revolution of the hand crank 70 for the forward stroke of the general operator, it carries with it the sleeve 123 and all parts mounted thereon, one-third of a revolution and leaves it there. During the return stroke of the hand crank 70 and the general operator 65, the pawl 124 escapes out of the notch 126 and returns to its full-line position. The sleeve 123, however, is picked up and carried on farther for the remaining two-thirds of a revolution. This is accomplished by providing a pick-up 127, which is mounted loosely on the sleeve 123 to rotate about the same axis as that of the shaft 71. The pick-up is provided with a gear 128, which meshes with a rack 129 (Fig. 10) carried by one of the side plates 66 of the general operator 65.

It will be seen that as the general operator 65 moves forwardly in the direction of the arrow in Fig. 10, it will rotate the gear 128 in the direction of the arrow thereon, which is opposite to the direction of rotation of the mutilated gear 72. The ratio of gearing between the mutilated gear 72 and the general operator 65, and from the general operator 65 to the rack 129 and to the gear 128, is such that the gear 128 will rotate twice as fast as the gear 72, and in the opposite direction.

The pick-up 127 in addition to the gear 128, is provided with a pawl or dog 130, which when the hand crank 70 is at its initial starting position, corresponding to 70ª (Fig. 10), will line up with the pawl 124 carried by the gear 72. It will be seen, however, that this pawl 130 moves backwardly with the gear 127 through two-thirds of a revolution, while the pawl 124 is advancing one-third of a revolution with the gear 72, so that the pawls 124 and 130, from a starting position in register with each other in the notch 126, which is wide enough for both pawls, will, at the end of the forward stroke of the hand crank 70, corresponding to the position 70ᵇ, once more be in register with each other at the position indicated at 124ᵇ (Fig. 12), both again in the notch 126. On the return stroke, however, of the general operator and the crank 70, the pawl 124 trips idly over the sleeve 123, while the pawl 130 takes up the work of advancing the sleeve 123 through the remaining two-thirds of a revolution, which will be accomplished during the return stroke of the general operator through the rack 129 and the gear 128.

The sleeve 123, then, has a comparatively slow advance of one-third of a revolution for the forward stroke of the general operator 65 and the hand crank 70, and a quick further advance of two-thirds of a revolution for the return stroke of the general operator 65 and the hand crank 70, giving in all one complete revolution of the sleeve 123 and the parts carried thereby, which includes the cam 101.

The return movement of the general operator 65 may be effected, if desired, by one or more springs 131 (Figs. 10 and 15), thereby insuring the return to a normal position. The return movement may be cushioned by means of a retarder 132, which permits a quick initial return movement for the greater part of the stroke, and a slow final movement, so as to surely take up the jar. This may consist of a piston 133 secured by its rod 134 to the general operator 65, and sliding in a cylinder 135. The cylinder is provided with a number of outlets 136, so that the air entrapped by the piston 133 for the first part of the return stroke thereof, can pass out quite freely, permitting the springs 131 to act quite rapidly. After the piston 133, however, passes the openings 136, a considerable amount of air is entrapped behind the piston which may pass out but slowly through a single aperture 137, so that while the complete return movement will be assured, the final portion thereof will be comparatively slow and cushioned to avoid jarring of the machine. Any full-stroke mechanism may be provided for insuring complete movements of the general operator and the hand crank 70, such as a two-way-acting spring pawl 138 (Fig. 6), which engages a sector ratchet 139 secured to the shaft 71.

Each of the computing wheels is prevented from rotating idly when not actually driven, by a detent roller 140 (Figs. 6 and 31), which normally engages between the teeth of the rear computing wheels 80. This detent roller 140 is mounted on a swinging frame 141, pivoted at 142, and having an arm 143 lying in the path of a pin 144 on the driver 97, so that as the driver moves downwardly to effect a shifting of the computing wheels for an adding or a subtracting operation, the detent 140 will be moved to a silent position. It will return, however, as soon as the gears 78 or 79 are moved out of mesh with the rack 77.

If a computing wheel passes through zero, it is necessary to effect a carry-over operation to the next higher computing wheel. This is done in the present instance by the rack bars 44 themselves, through the aid of the general operator 65. If a pin 43 is set up, the action is simple. Normally, when no tens-carrying operation takes place in connection with one of the bars 44, the bar moves a distance corresponding to the particular pin set, and to the numeral key having been struck to set such pin. If, however, a carry-over is to be effected through the accordant computing wheel, such rack bar moves an additional step to effect this carry-over operation.

The front of the row of pins 43 on each bar 44, there is provided a locking or blocking slide 145, which normally obstructs the movement of a pin 43 and its bar 44 beyond that accordant with the value of the numeral key which set it. The plungers 68, however, project to such a distance that by the time a set pin comes into engagement with its slide 145, the general operator 65 has not quite completed its forward movement, so that it is necessary to compress the spring 69 for a distance between two of the pins 43. If, however, a slide 145 is permitted to recede before the oncoming pin 43, then the spring 69 will not be compressed, but will advance the associated rack bar 44 an added step for a carry-over operation, which added step will be transmitted into a rotation of the associated computing wheel either forwardly or backwardly according to the character of computation. The slides 145 are normally held against a receding movement by means of a latch 146 (Figs. 31 and 32), of which there is one for each of the slides 145.

It will be noted in passing that the bar 44 for the units computing wheel does not have a slide 145 nor a latch 146, as there is no carry-over to be effected to it or its computing wheel, there being no computing wheel lower in denomination.

Each latch for a denominational member 44 is controlled from the computing wheel of next lower denomination. For this purpose, the latches 146, which hold the slides 145 against a forward movement under the pull of their springs 147, are connected by links 148 to starting trips 149 (Figs. 22, 24, 31 and 32). The springs 147 effect the double purpose of operating the slides 145, and holding the latches 146 in their locked position.

The links 148, as will be seen by reference to Figs. 7 and 16, are warped, so that each starting trip may be operated by a computing wheel of lower denomination while controlling a slide 145 of next higher denomination. The upper end of each trip 149 is beveled in both directions at 150 (Fig. 22), so as to be forced outwardly by a starting or carry-over member 151, in the form of a roller, located at a suitable point in the periphery of each of the computing wheels in the series 80. This enables the trips 149 to be actuated whether the computing wheels are rotated for addition or subtraction, as any computing wheel completes a revolution, so that the carry-over mechanism is brought into play in the same manner for both addition and subtraction.

It is thus evident that when any of the index pins 43 corresponding to the values from "1" to "9", is set on a denominational member 44, this denominational member can effect an added step of movement to its computing wheels whether adding or subtracting, when the next lower computing wheel completes a revolution. Such an action is plainly shown in Figs. 16 and 17 where the "1" pin is set, the carry-over action being started in Fig. 16, and finished in Fig. 17.

It is necessary, however, to effect such carry-over operation also in cases where no index pin 43 having a value from "1" to "9" is set on a denominational member, as in the case where "1" is carried to a computing wheel having no digits run in by its rack bar 44, corresponding to the striking of the "0" key.

To enable such carry-over operations, there is provided on each of the denominational bars 44 of higher value than the units bar, a special carry-over pin 152, which is located one step in advance of the "1" index or valuating pin 43, so as to correspond to an added rotation of one-tenth of a revolution of the computing wheel associated with a denominational bar 44 bearing the same. This special carry-over pin 152 (Figs. 31 and 32) normally tends to assume a depressed or set position (Fig. 18) under the propulsion of a spring 153, of which there is one for each carry-over pin. The carry-over pins 152, however, are held in their raised position by a timing guard 154 (Figs. 24 and 30), which is universal to all of the carry-over pins 152. The guard 154 holds the pins 152 high enough so that if a rack bar 44 moves forwardly due to the general operator engaging any other set pin from "1" to "9", the carry-over pin 152 on this bar will ride on top of the associated slide 145, as in Figs. 16 and 17. In order to insure this riding, the carry-over pins 152 are formed as shown in Fig. 24ª, with a laterally-projecting foot 155 forming an extensive surface overlapping all exposed slots in the upper surface of a guiding block 156 in which the slides 145 reciprocate.

The carry-over pins 152, then, do not interfere with the normal driving operation of the bars 44 in running up digits into the computing wheels corresponding to the particular index pins 43 set up on these bars; nor do they interfere with carry-over operations effected by said index pins from "1" to "9". If, however, no pin from "1" to "9" should happen to be set on a denominational bar 44, as the general operator approaches the end of its forward stroke, the particular plunger 68 corresponding to this denominational member 44 will engage the carry-over pin 152, and tend to force the same forward together with the rack bar 44, the pin 152 having in the meanwhile come down into the path of its associated plunger 68. If, however, the latch 146 in this particular denominational bar has not been tripped by a complete rotation of the next lower computing wheel, the spring 69 will merely be compressed without advancing the associated rack bar 44. If, on the other hand, the next lower computing wheel has passed through zero, the slide 145 will have been released, so that the carry-over pin 152 will be permitted to travel forward in the socket of its slide, which has receded before it, thereby permitting the spring 69 and the plunger 68 to advance the rack bar 44 one step at the last portion of the forward stroke of the general operator 65. This action is shown in Fig. 18.

As will be seen by reference to Fig. 25, the slideways or sockets for the slides 145, are provided with additional lateral cavities 157, to allow for the laterally extending feet 155 of the carry-over pins 152.

It has been stated above that the guard 154 normally holds the carry-over pins 152 in their raised position clear of the plungers 68, but that these pins are permitted to come into the path of movement of the plungers 68 near the end of the forward stroke of the general operator 65. This action is accomplished by mounting the guard 154 on a swinging frame 158 (Figs. 19, 20, 24, 31 and 32), so as to have a vertical up-and-down movement as the frame swings.

The frame 158, which is pivoted at 159, includes an arm 160 having a follower roller 161, which is held in engagement with a cam 162 (Fig. 29) by means of a spring 163. The cam 162 has a depressed dwell portion 164, in engagement with which the follower 161 is maintained during the major portion of the forward stroke of the general operator 65, the cam 162 being mounted on the sleeve 123, which, it will be remembered, is rotated one-third of a revolution during the advancing stroke of the general operator, and a further two-thirds of a revolution in the same direction during the return stroke of the general operator.

As the general operator completes a forward movement corresponding to the taking up of the distance before engaging with any of the set index pins 43, plus the maximum distance of nine steps corresponding to the setting of a "9" pin (Fig. 19), then a rise or cam incline 165 forces the follower 161 outwardly abruptly, thereby causing the frame 158 to rock to withdraw downwardly the guard 154, thus permitting the springs 153 to act to project any such of the carry-over pins 152 as may not as yet have been slid over the top of the slides 145, down into the path of the associated plungers 68, so that they may be engaged by the latter to advance the associated rack bars 44 one step during the remaining portion of the forward movement of the general operator (Fig. 18). This will occur, of course, only when a denominational bar 44 has had no pin 43 from "1" to "9" set up thereon. At all other times, the guard 154 remains in its upper position so long, that the engagement of the general operator with any of the set pins 43, will advance the carry-over pin 152 to an ineffective position resting on top of the associated slide 145 and the block 156.

The cam 162 has a dwell portion 166 at its upper level on which the follower roller 161 remains for most of the return stroke of the general operator, including the last two-thirds of a revolution of the sleeve 123, and, in fact, until the very last portion of the return stroke of the general operator, when the pins 152 have already had a chance to be once more brought above the guard 154 clear of the slides 145, when the cam roller 161 will drop on to the lower level 164, by means of a dip 167. The guard 154 is beveled at 168, so that if perchance any index pin 43 of lower value than the pin engaged by the general operator 65 in the act of driving, should be set accidentally, it will be cammed up to an unset position during the forward movement of the associated bar 44, so as not to engage the slide 145 and interrupt the movement of the general operator.

It will be noted in passing that at the end of the forward stroke of the general operator 65, all the springs 69 which have not effected a carry-over operation, are under a compression, so that a series of successive carry-over operations from lower to higher denominations of adjacent computing wheels, can be effected even after the general operator has reached the end of its forward stroke.

As the general operator returns, it is necessary to reprime or re-set all of the carry-over locking slides 145 as may have been tripped to permit carry-over operations. To do this, there is provided a restoring or re-setting rail 169 (Figs. 22, 31 and 32), which is universal to all of the slides 145, and is arranged to engage them at their tail ends. The rail 169 is mounted on a frame 170, pivoted at 171, and is normally held out of engagement with the slides 145 by a spring 172. The universal rail 169, however, is swung rearwardly during the return stroke of the general operator, by means of an arm 173 connected to the frame 170, and having a follower 174 engaging a cam 175 (Fig. 30) secured to the sleeve 123, which, it will be remembered, has a complete rotation during the reciprocation of the general operator.

The cam 175 has a dwell portion 176 for the major portion of its circumference, which is in engagement with the follower roller 174 during the forward stroke of the general operator and for some portion of the return stroke of the general operator, but is provided with a gradually inclined rising cam surface 177, which forces the follower roller 174 outwardly, and thereby causes the universal rail 169 to gradually tension all of the springs 147 as may have collapsed in a carry-over operation by returning the slides 145 to their obstructing positions, and lock them in such positions by their associated latches 146. At the end of the return stroke of the general operator 65, the follower roller 174 drops off the raised portion 177 of the cam 175, by means of a dip 178, through the aid of the spring 172, so as to return the lower level 176. This will carry the rail 169 clear of the slides 145, so that they may be freely tripped for a subsequent tens-carrying operation.

After the set index or valuating pins 43 have fulfilled their function of determining the extent of movement of the bars 44, it is necessary to restore them to their unset position to enable subsequent computations to be set up in the nest of pins. This is done on the return stroke of the general operator. The sleeve 123 has a cam 179 (Fig. 28) which controls the movements of a pin restorer 180. This pin restorer 180 includes a follower 181 which engages the cam 179, a bell crank 182 on which the follower 181 is mounted, and a pin-restoring roller 183 which lies transversely of the bars 44 in subjacent relation thereto. On the forward stroke of the general operator, the pin-restoring roller 183 is held clear of the set pins 43 by the outer or upper level 184 of the cam 179. By the time the general operator starts to return, however, the follower 181 will have dropped on to the lower or inner level 185 of the cam 179, thereby permitting a spring 186 to raise the restoring roller in back of the row of set pins which have advanced at least up to the slides 145, and in some instances where tens carrying has taken place, into the guideways of the slides.

As soon as the general operator, by the engagement of the cross bar 67 with the lugs 75, returns the bars 44, the pins 43 will roll up on the restoring roller 183 and be projected to their uppermost unset positions. On the subsequent forward stroke of the general operator before any of the set pins 43 can have been advanced to the range of the restoring roller 183, the latter will have been depressed clear of the path of the set pins.

The operation can best be considered by illustrating the same with an example. We will assume that the totalizer or computing head already registers 6731, which number may have been previously run into the same. It will also be assumed that the number 3079 is to be added to the number already registered in the computing head. The carriage 7 from its starting point at the extreme right, is advanced by the tabulating mechanism or in any other suitable manner, until the proper letter space corresponding to the thousands column comes into register with the printing point of the typewriting mechanism. The denominational selection for the computing mechanism will be automatically accorded with the denomination of this digit column, by a train of gearing 19 to 25 automatically rotating the worm wheel 26, so as to position the selector 28 synchronously with the position of the carriage 7. Thus the selector 28 will be brought with its upstanding finger 32 in register with the selector bar 34 (fourth from the bottom in Figs. 7 and 15), which is the thousands selector bar.

The numeral key "3" may then be struck to print the digit "3" on the work-sheet on the platen 6. At the same time, the thrust link 36 will be depressed so that the cam 37 will, through the link 39 and the universal actuating frame 40, rock the selector 28 to advance the thousands selector bar 34. This will bring all of the interponent pins 45 from an idle position to a position between the setting linkages 50 and the index pins 45 on the thousands denominational driving bar 44. As the key "3" continues to descend, it will lock all other keys from being actuated, by actuating the locks 64, and will also rock the shaft 48 for the pin-setting linkage 50 corresponding to "3." This will set up the third index pin 43 from the front of the thousands bar 44, which will be held in its set position. As the numeral key "3" returns, the selector bar 34 for the thousands denomination will be returned by its spring 35, and the linkage 50 actuated by this numeral key will also return to a passive position.

The same return movement permits an escapement of the carriage 7 to the next letter space or digit column. This movement of the carriage will be transmitted so that the selector 28 will advance in the opposite direction a corresponding amount so as to come into register with the hundreds denominational selector bar 34, that is, the third one from the bottom (Figs. 7 and 15). The "0" numeral key will then be struck to print "0," but inasmuch as this requires no registration in the computing mechanism, the "0" key is unprovided with a thrust link 36 and actuating mechanism. The computing mechanism will hence be idle in this particular denominational column.

The return of the "0" key will space the carriage 7 once more, and together with it the denominational selector 28, which will come into register with the denominational bar 34 for the tens column, the second one from the bottom (Figs. 7 and 15). The "7" key is then struck, printing "7" and setting up the "7" pin on the tens bar 44. The carriage and the denominational selecting mechanism again advances to the units column, where the "9" key is struck with the printing and setting up of "9."

We now have the complete number "3079" which is to be added, set up in the nest of pins 43. The general operator may be then actuated by pulling forward the crank 70. At the very first portion of the advance movement of the crank 70 of the general operator, of about the extent indicated from $x$ to $y$ in Fig. 20, the cam 101 will force, by means of its rise 102, the follower 100 out on to the outer circle or dwell portion 103. Inasmuch as the adding and subtracting bar 97 is in its adding position (Figs. 6 and 24), the gears 94 and 95 will be rotated in the direction of the arrow in Fig. 24, depressing the rack bars 91 so as to bring the gears 78 into mesh with the rack 77 on the denominational bars 44, whereby when these bars are advanced, the dial wheels 82 will be rotated for addition. There is sufficient lost motion between the general operator and the set pins 43 to permit this meshing before the bars 44 are driven by the general operator. A further forward movement of the general operator will bring the plungers 68 into engagement with set pins on the thousands, tens, and units bars, advancing these bars corresponding to the particular amounts corresponding to the particular pins set. The springs 69 are strong enough so that they will not be collapsed nor compressed during this action.

The special pins 152 for the thousands, tens, and units columns will be forced up by the timing guard 154 on top of the block 156 and the slides 145, so that they will ride idly forward, the guard being held in its raised position during the major and initial portion of the stroke of the general operator. The special pin 152 for the hundreds column, however, while elevated to the Fig. 32 position, will not advance, inasmuch as its bar 44 is not advanced.

Inasmuch as but "3" is added to "6" in the thousands column, the sum total in this column is but "9," so that the tens-carrying mechanism will not come into play in this column. Further, in the hundreds column nothing being added, the tens-carrying mechanism to the thousands column will be inactive. In the tens column, however, "7" being added to "3," the tens-carrying mechanism will come into play.

As the tens computing wheel is rotated to zero, its special tooth 151 will cam out the trip 149 to release the latch 146, thereby permitting the slide 145 for the next higher denomination, which is the hundreds, to reset. Inasmuch as the hundreds rack bar 44 has not been driven, the special pin 152 will in the meantime have remained in front of its slide 145, having formed, however, an obstruction for the associated plunger 68, causing a compression of the spring 69 therefor at the end of the forward stroke of the general operator. This was all permitted by the timing guard 154 having been withdrawn to permit the spring 153 to depress this special pin 152 in the path of the associated plunger 68. As soon then as the slide 145 is withdrawn out of the way by the tens-carrying action of the tens computing wheel, the spring 69 will expand, driving its plunger and the hundreds rack bar 44 before it one step, so as to rotate the hundreds computing wheel and its dial wheel one step, to carry "1." The units computing wheel also having advanced through zero, will trip the slide 145 for the tens denomination, so that the rack bar 44 for the tens computing wheel will be advanced an added step by the expansion of the associated springs 69.

This tens-carrying all takes place at the end of the forward stroke of the general operator. On the return stroke of the general operator, the sleeve 123 and the cams carried thereby, which were previously only rotated one-third of a revolution, will be deserted by the pawl 124, which returns idly to its home position. The work of this pawl, however, will be taken up by the pawl 130, which in returning to its home position will advance the sleeve and the cams carried thereby the remaining two-thirds of a revolution. On the return stroke, the cams 179 and 175 will come into play to respectively restore the pins 43 by means of the restoring roller 183, and restore the slides 145 by means of the resetting rail 169, so that by the time the general operator reaches its home position corresponding to the position 70ª of the crank in Fig. 10, all parts of the computing mechanism will be in a position to permit the setting up and running up of a new number. In the present instance, the general operator may be returned automatically by the springs 131, the action of which is governed so as to permit a speedy and yet cushioned return by means of the retarder 132.

If, in place of an adding operation, a subtracting operation had been desired, the subtraction key 110 would have been depressed before the action of the general operator, so as to depress the bar 97 in its Figs. 31 and 32 position. Under such circumstances on the initial or forward stroke of the general operator, the gears 79 will be brought into mesh with the racks 77 in place of the gears 78, so that the dial wheels 82 will be rotated in the opposite direction. The tens-carrying will take place as before, inasmuch as it is immaterial which way the computing wheels rotate, for in both directions of rotation they will trip the tens-carrying units.

Variations may be resorted to within the scope of the invention, and portions of the improvements may be used without others.

Having thus described my invention, I claim:

1. The combination with a plurality of series of computing wheels, having computing wheels of according denominations always intergeared so as to be driven from each other, of a single series of racks for driving said computing wheels in alternation, shifting means for moving one or the other of said series of computing wheels into mesh with said racks to bring about a direct driving relation with one or the other of said series of computing wheels so as to effect either an adding or a subtracting operation on the same type of movement of said racks, a general operator for driving said racks and operating said shifting means, a subtraction key, locking means for holding said shifting means, and connections whereby said operator locks said shifting means independently of said key.

2. The combination with two series of computing wheels having like denominations intergeared so that the one will be driven from the other, of a series of racks for driving said computing wheels, a floating frame for swinging said computing wheels alternatively into mesh with said racks so as to drive said computing wheels in opposite directions, a rack bar for shifting said floating frame, and a gear for driving said rack bar.

3. The combination with two series of computing wheels having like denominations intergeared so that the one will be driven from the other, of a series of racks for driving said computing wheels, a floating frame for swinging said computing wheels alternatively into mesh with said racks so as to drive said computing wheels in opposite directions, a rack bar for swinging said floating frame, a gear for driving said last-mentioned rack bar, and a double-acting driving member for alternatively rotating said gear in opposite directions.

4. The combination with two series of computing wheels having like denominations intergeared so that the one will be driven from the other, of a series of racks for driving said computing wheels, a floating frame for swinging said computing wheels alternatively into mesh with said racks so as to drive said computing wheels in opposite directions, a rack bar for shifting said floating frame, a gear for driving said last-mentioned rack bar, and a duplex rack bar having oppositely-acting racks shiftable alternatively into mesh with said gear, so as to drive the same in opposite directions.

5. The combination with two sets of computing wheels intergeared so as to drive each other, of a series of racks for driving said computing wheels, pins on said racks settable to determine the extent of movement thereof, a floating frame normally occupying an intermediate neutral position and supporting both sets of said computing wheels normally out of mesh with said racks, and a bar connected to said floating frame and movable alternatively in opposite directions from an intermediate neutral position so as to swing either of said sets of computing wheels into mesh with said racks.

6. The combination with two sets of computing wheels having like denominations intergeared so as to drive each other, of a series of racks for driving said computing wheels, a floating frame for supporting said computing wheels and normally holding both sets of computing wheels out of mesh with said racks, a pair of rack bars for shifting said floating frame alternatively in opposite directions from an intermediate neutral position so as to bring about a driving relation of either of said sets of computing wheels with said racks, a pair of gears for driving said rack bars alternatively in opposite directions, and a duplex rack bar for driving said gears alternatively in opposite directions.

7. The combination with two sets of computing wheels having like denominations intergeared so as to drive each other, of a series of racks for driving said computing wheels, a floating frame for supporting said computing wheels and normally holding both sets of computing wheels out of mesh with said racks, a pair of rack bars for shifting said floating frame alternatively in opposite directions from an intermediate neutral position so as to bring about a driving relation of either of said sets of computing wheels with said racks, a pair of gears for driving said racks bars alternatively in opposite directions, a duplex rack bar for driving said gears alternatively in opposite directions, and a cam for driving said duplex rack bar.

8. The combination with a series of dial wheels, of alternative gearing for driving said dial wheels in opposite directions for addition or subtraction, driving means for said gearing, shifting means for bringing about a change in drive of said dial wheels for addition or subtraction, a driver for operating said shifting means having two positions, one corresponding to adding and the other corresponding to subtracting, means for changing the position of said driver to determine the character of computation, and locking means for maintaining said driver in a given position corresponding to a given state, after it has once started the action of said shifting means and until the computation including the driving of said dial wheels is completed.

9. The combination with a series of dial wheels, of alternative gearing for driving said dial wheels in opposite directions for addition or subtraction, driving means for said gearing, shifting means for bringing about a change in drive of said dial wheels for addition or subtraction, a driver for operating said shifting means having two positions, one corresponding to adding and the other corresponding to subtracting, means for changing the position of said driver to determine the character of computation, said driver having a movement from a normal silent position, and separate locking means for maintaining the driving relation of said driver to said shifting means in each of its positions while said driver is out of its normal silent position.

10. The combination with a series of dial wheels, of alternative gearing for driving said dial wheels in opposite directions for addition and subtraction, driving means for said gearing, shifting means for bringing about an alternative driving relation between said gearing and said driving means, a driver for said shifting means having two selected paths of movement corresponding to an actuation of said shifting means in opposite directions for adding or subtracting, said driver also having a longitudinal movement corresponding to its actuation of said shifting means for a shift for either addition or subtraction, a lock for maintaining said driver in one path of movement after it is started in such path, and a lock for maintaining said driver in its other path of movement after it is started in that path.

11. The combination with a series of dial wheels, of alternative gearing for driving said dial wheels in opposite directions for adding and subtracting, driving means for said gearing, shifting means for bringing about an alternative driving relation between said gearing and said driving means, a driver for said shifting means having two selected paths of movement corresponding to an actuation of said shifting means in opposite directions for adding or subtracting, said driver also having a longitudinal movement corresponding to its actuation of said shifting means for a shift for either addition or subtraction, a lock for maintaining said driver in one path of movement after it is started in such path, and a lock for maintaining said driver in its other path of movement after it is started in that path, said locks acting in alternation as returning means for said driver.

12. The combination with registering mechanism, of subtraction-setting mechanism for said registering mechanism, a subtraction key for controlling said subtraction-setting mechanism, a general operator, a handle for driving said registering mechanism through said operator, and shifting the subtraction-setting mechanism to effective position when the subtraction key is effective, an automatic lock catching said key in its actuated position until the handle is actuated, a trip operated by said subtraction-setting mechanism for releasing said lock and said key by the operation of the handle, and a second locking means to hold the subtraction-setting mechanism effective until the actuation of the register by the general operator is complete.

13. The combination with registering mechanism and a general operator for driving it, of subtraction-setting mechanism for said registering mechanism, a subtraction key for operating said subtraction-setting mechanism, an automatic lock catching said key in its actuated position, a trip operated by said subtraction-setting mechanism for releasing said lock and said key, and additional locking means for said subtraction-setting mechanism automatically coming into play after the release of said lock, for locking it until the end of the driving movement of the general operator.

14. The combination with registering mechanism and a general operator for driving it, of state-controlling mechanism for changing the character of computation run into said registering mechanism, a key for shifting said state-controlling mechanism, a lock for said key, a trip for said lock coming into play during the action of said state-controlling mechanism, and an additional lock for preventing change of the state-controlling mechanism during the driving action of the general operator.

15. The combination with a computing mechanism, of a general operator having an advance and a return mechanism to actuate said computing mechanism, other devices for controlling the action of said computing mechanism when so actuated, followers for controlling said devices, cam means comprising dwells and steep slopes for operating said followers, a reciprocating handle for operating said general operator, and means whereby said cam means is rotated at various speeds during the actuation of said handle.

16. The combination with computing wheels, of driving members for said computing wheels having a series of elements settable thereon to determine the extent of driving movement of said driving members, a general operator for driving said wheels and a restoring roller, normally in ineffective position, but made effective after a computing actuation of said operator, for unsetting said elements as said members pass by said roller.

17. The combination with a plurality of computing wheels, of driving members for said computing wheels, each having a series of settable elements thereon to determine the extent of driving movement thereof, a restoring roller for said elements, and shifting means for said restoring roller, maintaining said roller clear of said elements during the driving movement of said members, and bringing said restoring roller in the path of said elements during the non-driving movement of said members.

18. The combination with a plurality of computing wheels, of driving members for said computing wheels, elements settable to determine the extent of driving movement of said members, a restoring roller for said elements, and shifting means for moving said restoring roller into and out of its restoring position.

19. The combination with a plurality of computing wheels, of driving members for said computing wheels, a series of elements for each of said driving members settable to determine the extent of driving movement thereof, a restoring roller for returning said elements to their unset position, a spring normally tending to maintain said roller in the path of movement of said settable elements, and a cam for maintaining said roller out of the path of movement of said elements during the computing movement of said elements and said members, and permitting the return of said restoring roller to a restoring position after the computing movement of said elements and said members.

20. The combination with a plurality of computing wheels, of a series of rack bars for driving said computing wheels, each having a series of pins thereon settable to determine the extent of movement thereof, a general operator engaging said pins to advance said rack bars, a restoring roller movable into the path of said pins to restore the same to their unset position, a spring for moving said restoring roller in one direction, and a cam for moving said restoring roller in the opposite direction.

21. The combination with a plurality of computing wheels, of driving members for said computing wheels, elements settable to determine the extent of driving movement of said members, and restoring means shifted into the path of movement of said elements for restoring falsely set elements in the advance of correctly set elements.

22. The combination with a plurality of computing wheels, of driving members for said computing wheels, a series of elements settable to determine the extent of driving movement of said members and corresponding to the position of different values from "1" to "9," restoring means positioned in advance of said elements during the advance movement thereof to unset elements of lower value where a plurality of elements are set in the same order for the same driving member, and restoring means for restoring all elements after a computation has been completed.

23. The combination with a plurality of computing wheels, of driving members for said computing wheels having a plurality of elements for determining the extent of movement thereof, means located in the path of movement of said elements for moving the same to a cleared position in advance of a complete movement of said members, and clearing means for retrieving said last-mentioned means out of the path of said elements as said members approach the end of their advancing movement.

24. The combination with a plurality of computing wheels, of driving members for said computing wheels, a plurality of elements for each driving member to determine the movements thereof, and a plurality of clearers common to said elements for moving the same to a silent position at different times, and camming means for timing the position of said clearers with respect to said elements during the traveling movements thereof.

25. The combination with a plurality of computing wheels, of driving members for said computing wheels, elements on said driving members settable to determine the extent of movement thereof, obstructing slides located in the path of movement of said elements, and means for tripping said obstructing slides from said computing wheels so as to permit them to slide backward before the oncoming driving members to cause added carry-over movements of said driving members.

26. The combination with a plurality of computing wheels, of driving members individual to said computing wheels, slides normally held to obstruct and stop the movement of said members under predetermined travels thereof, and trips operating from said computing wheels as they pass through zero, to release the slides for the next higher computing wheels, so as to permit them to slide backward befor the oncoming driving members, to cause added carry-over movements of the driving members therefor, 27. The combination with a plurality of computing wheels, of driving members individual to said computing wheels, slides normally held to obstruct and stop the movement of said members under predetermined travels thereof, a trip operating from one of said computing wheels as it passes through zero, to release the slide for the next higher computing wheel so as to permit an added carry-over movement of the driving member therefor, a series of plungers one for each of said driving members adapted to give such carry-over movement, and spring means for actuating said plungers.

28. The combination with a plurality of computing wheels, of driving members for said computing wheels, a series of elements on each of said driving members settable to determine the extent of movement thereof, a series of blocks, one for each of said members, lying in the path of movement of said settable elements so as to obstruct the movement of said driving members by engagement with set ones of said settable elements, locking means for said blocks, tripping means actuated from said computing wheels for releasing said locking means and said blocks, a general operator, and yielding means coöperating with said elements to drive said members, said yielding means adapted to store up a certain amount of energy available at the termination of the movement of said general operator to effect carry-over operations when a computing wheel of low denomination passes through zero and trips the lock for the block of the next higher driving member, permitting said block to recede before the settable element on the corresponding driving member for a carry-over movement.

29. The combination with a plurality of computing wheels, of a plurality of driving members for said computing wheels, each having a series of elements thereon settable to determine the extent of movement thereof and corresponding in value from "0" to "9," means lying in the path of movement of said settable elements for preventing movements of said driving members more than those corresponding to the accordant values of the elements set, and tripping means for said first-mentioned means controlled from said computing wheels for permitting added carry-over movements of said members through the intermediary of said elements when the next lower computing wheels pass through zero by allowing said first-mentioned means to recede before certain of said settable elements corresponding to said wheels to be carried to.

30. The combination with a plurality of computing wheels, of driving members for said computing wheels, each of said driving members having a series of elements settable to determine the extent of movement of said driving members and corresponding in position to values from "0" to "9," and a general operator acting by engagement with the set ones of said elements to drive said members variable distances from "1" to "9," according to the element set, and an added distance when the next lower computing wheel goes through zero.

31. The combination with a plurality of computing wheels, of a plurality of driving members for said computing wheels, each of said driving members having a series of elements settable to determine the extent of movement thereof corresponding in value from "1" to "9", a general operator engaging said settable elements to drive said members, and a supernumerary element on each of said driving members engaged by said general operator to effect a carry-over operation when none of said elements has been set up thereon.

32. The combination with a plurality of computing wheels, of driving members for said computing wheels, a series of elements settable to determine the extent of movement of said driving members, a general operator for driving said members through the intermediary of said elements, supernumerary elements in series with said first-mentioned elements normally in a set position, obstructing means lying in the path of movement of said elements, and clearing means for moving said supernumerary elements to a position clear of said obstructing means during advancing movements of said members when one of said first-mentioned elements in the same series with the supernumerary element is set.

33. The combination with a plurality of computing wheels, of driving members individual to said computing wheels, a general operator for actuating said driving members, supplementary spring-actuated members individual to said driving members and forming part of said general operator, pins on said driving members for limiting the driving movement thereof, obstructing members lying in the path of such of said pins as are projecting for so limiting said movement, and means for effecting a carry-over in a computation by shifting the appropriate obstructing members.

34. The combination with a plurality of computing wheels, of driving members individual to said computing wheels, a general operator for actuating said driving members, supplementary spring-actuated members individual to said driving members and forming part of said general operator, pins on said driving members for limiting the driving movement thereof, obstructing members lying in the path of such of said pins as are projecting for so limiting said movement, means for effecting a carry-over in a computation by shifting the appropriate obstructing members, a latch for holding each of said obstructing members effective, a single spring for each obstructing member normally tending to draw its obstructing member to its withdrawn position, and a latch for each obstructing member normally holding its obstructing member in effective position by the same spring.

35. The combination with a plurality of computing wheels, of driving members individual to said computing wheels, a general operator for actuating said driving members, supplementary spring-actuated members individual to said driving members and forming part of said general operator, pins on said driving members for limiting the driving movement thereof, obstructing members lying in the path of such of said pins as are projecting for so limiting said movement, means for effecting a carry-over in a computation by shifting the appropriate obstructing members, carry-over teeth on said computing wheels, and a series of tripping arms, each connected to be effective on its obstructing member, and controlled by the computing wheel next lower in denomination.

36. The combination with a plurality of computing wheels, of driving members individual to said computing wheels, a general operator for actuating said driving members, supplementary spring-actuated members individual to said driving members and forming part of said general operator, pins on said driving members for limiting the driving movement thereof, obstructing members lying in the path of such of said pins as are projecting for so limiting said movement, means for effecting a carry-over in a computation by shifting the appropriate obstructing members, a latch for holding each of said obstructing members effective, a single spring for each obstructing member normally tending to draw its obstructing member to its withdrawn position, a latch for each obstructing member normally holding its obstructing member in effective position by the same spring, and a restoring bar universal to all the obstructing members and adapted to be actuated at the end of a computation to restore said obstructing members to their effective position and put them under the control of their latches.

37. The combination with a plurality of computing wheels, of a gang drive for said computing wheels, including a series of driving members and pins on said driving members settable to determine the extent of movement thereof, a series of obstructing members for normally limiting the extent of driving movement of the elements of said gang drive, locking means for maintaining said obstructing members in their obstructing positions, tripping means operated from said computing wheels once in every cycle thereof to release said locking means, thereby permitting said obstructing members to recede before the elements of said gang drive, a bar universal to all said obstructing members for restoring such of said obstructing members as have receded, to their normal obstructing positions, and a cam passive during the driving movement of said gang drive, and active during the return movement of said gang drive, to operate said universal bar.

38. The combination with computing wheels, of a gang drive for said computing wheels, including a series of driving members and pins on said driving members settable to determine the extent of movement thereof, a series of obstructing members normally lying in the path of movement of the elements of said gang drive, so as to terminate such movement, connections for enabling said obstructing members to recede before and in line with the oncoming associated elements of said gang drive when an associated computing wheel makes a complete cycle, so as to effect a carry-over operation, and restoring means for returning such of said obstructing members as have been receded, to their normal obstructing positions, as the elements of said gang drive are returned to their normal positions.

39. The combination with a series of computing wheels, of a driving element for each of said computing wheels each driving element having a series of pins thereon settable to determine the extent of movement thereof, one of said pins being supernumerary and acting only when none of the remaining pins are active, an obstruction normally lying in the path of such one of said pins as is active, so as to terminate the movement of said driving element, said driving element receding at times before the oncoming active pin to permit an excessive movement of said driving element, and shifting means for moving said supernumerary pin to an inactive position when another of said pins is in action, so that said supernumerary pin may ride on top of said obstruction.

40. The combination with a computing wheel, of a driving element for said computing wheel having a series of members thereon settable to determine the extent of movement thereof, one of said members being supernumerary and possibly acting only when none of the remaining members are active, an obstruction normally lying in the path of such one of said members as is active so as to terminate the movement of said driving element, said driving element receding at times before the oncoming active member to permit an excessive movement of said driving element, shifting means for moving said supernumerary member to an inactive position when another of said members is in action, so that said supernumerary member may ride on top of said obstruction, and a support for said obstruction having a slideway therein permitting the movement of said obstruction and also the intrusion of the active one of said members, said supernumerary member having a lateral foot permitting the same to ride on top of said support and said obstruction when said supernumerary member is inactive.

41. The combination with a computing mechanism, of a plurality of numeral keys for said computing mechanism, a normally idle denominational selector for said computing mechanism, traversing means for moving said denominational selector to different selecting positions, actuating means for operating said denominational selector, universal to all selecting positions thereof, and camming means individual to each of said numeral keys for making said actuating means effective to select a denomination.

42. The combination with a computing mechanism, of numeral keys for said computing mechanism, a denominational selector for said computing mechanism, traversing means for shifting said denominational selector to different positions, actuating means for operating said denominational selector, a member connected to each of said numeral keys, a cam on each of said members, and connections to said universal means enabling any of said cams at the operation of any of said numeral keys, to operate said actuating means so as to effect a denominational selection.

43. The combination with computing mechanism, of numeral keys for said computing mechanism, denomination-selecting means for said computing mechanism, members connected to said numeral keys for actuating both said computing mechanism and said denomination-selecting means, guiding means for forcing said members to travel in a substantially rectilinear path, a lock for preventing more than one of said numeral keys operating at a time, and an intruder for making said lock effective pivotally mounted on each of said members for each of said numeral keys, so as to admit of a relative movement with respect to said member as the same moves in a substantially rectilinear direction.

44. The combination with a computing member, of a series of computing pins mounted in said member and settable to determine the extents of computation, and a single detent for all of said pins having integral spring fingers, one for each pin.

45. The combination with computing wheels, of driving members for said computing wheels, pins on said driving members settable to determine the extent of movement thereof, a general operator for actuating said driving members through the intermediary of said pins, and cushioning means interposed between the set pins and said general operator when the latter is driving said driving members.

46. The combination with computing wheels, of driving members for said computing wheels, pins settable on said driving members to determine the extent of movement thereof, and setting means for setting said pins one by one while said driving members remain in their normal position.

47. The combination with computing wheels, of driving members for said computing wheels, pins settable on said members to determine the extent of driving movement of said members, denominational selecting mechanism independent of joinder with said driving members, and acting by a movement relative to said members while said members remain stationary, to enable the setting of said pins.

48. The combination with a computing mechanism, including numeral keys, of a traveling denominational selector for said computing mechanism, a traveling typewriter carriage controlled by said numeral keys, gearing between said carriage and said selector, whereby both always positively move together when either moves, a single actuating means operated by said keys and universal to all the positions of said selector to actuate it in any selected position, and connections whereby each key is effective on said universal means.

49. The combination with a series of computing wheels, of a gang-drive for said computing wheels, a series of pins on the elements of said drive, some normally projected and others settable to determine the extents of driving and computing movements thereof, obstructing members lying in the path of said projected pins for limiting the driving movement thereof, and arranged to determine extra movements of said driving elements for carry-over operations, pin-restoring and clearing means acting as the driving elements advance to clear any pins, tending to engage said obstructing members in advance of the pins set to determine the computation, restoring means for the pins set to determine the computation acting on the return stroke of said gang-drive, and a plurality of cams, one for each restoring means, having their actions timed to cause the actions of the restoring means to take place at proper intervals relatively to each other.

50. The combination with a series of computing wheels, of racks for driving said computing wheels, said computing wheels being normally out of mesh with said racks, detent means for holding said computing wheels against accidental rotation when out of mesh with said racks, and shifting means for moving said detent means toward said computing wheels, and said computing wheels toward said detent means, at the same time moving said computing wheels away from said racks, said shifting means also moving said detent means away from said computing wheels, and said computing wheels away from said detent means, at the same time moving said computing wheels toward said racks to engage therewith.

FREDERICK A. HART.

Witnesses:
W. O. WESTPHAL,
DELOS G. HAYNES.